(12) United States Patent
Hanson et al.

(10) Patent No.: US 8,287,953 B2
(45) Date of Patent: Oct. 16, 2012

(54) METHOD FOR SPIN COATING A SURFACE OF AN OPTICAL ARTICLE

(75) Inventors: James Hanson, St. Petersburg, FL (US); Herbert Mosse, St. Petersburg, FL (US)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 515 days.

(21) Appl. No.: 12/367,798

(22) Filed: Feb. 9, 2009

(65) Prior Publication Data
US 2010/0203240 A1 Aug. 12, 2010

(51) Int. Cl.
*B05D 3/12* (2006.01)
(52) U.S. Cl. .......... 427/240; 427/164; 427/425; 118/52; 118/320
(58) Field of Classification Search .................. 427/240, 427/299, 331, 425, 164; 118/52, 54, 320
See application file for complete search history.

(56) References Cited

U.S. PATENT DOCUMENTS

| | | | |
|---|---|---|---|
| 4,211,823 A | 7/1980 | Suzuki et al. | |
| 4,822,639 A | 4/1989 | Fujii et al. | |
| 5,316,791 A | 5/1994 | Farber et al. | |
| 5,619,288 A | 4/1997 | White, Jr. et al. | |
| 6,436,851 B1 | 8/2002 | Young et al. | |
| 6,489,028 B1 | 12/2002 | Degand et al. | |
| 6,503,631 B1 | 1/2003 | Faverolle et al. | |
| 6,551,710 B1 * | 4/2003 | Chen et al. | 428/412 |
| 7,186,359 B2 | 3/2007 | Maisonnier et al. | |
| 2004/0052956 A1 * | 3/2004 | Courtenay | 427/421 |
| 2005/0039675 A1 | 2/2005 | Kang et al. | |
| 2006/0223336 A1 * | 10/2006 | Wei | 438/782 |
| 2007/0034322 A1 * | 2/2007 | Glacet et al. | 156/230 |
| 2007/0035070 A1 * | 2/2007 | Jiang et al. | 264/500 |
| 2007/0115426 A1 | 5/2007 | Maisonnier et al. | |
| 2008/0003356 A1 * | 1/2008 | Samukawa et al. | 427/164 |

FOREIGN PATENT DOCUMENTS

| | | |
|---|---|---|
| EP | 0 614 657 | 9/1994 |
| EP | 0 614 957 | 9/1994 |
| EP | 1 161 512 | 2/2004 |
| FR | 2 811 322 | 1/2002 |
| WO | 2006/008125 | 1/2006 |
| WO | 2006/133307 | 12/2006 |

* cited by examiner

*Primary Examiner* — Kirsten Jolley
(74) *Attorney, Agent, or Firm* — Young & Thompson

(57) ABSTRACT

A method for spin coating a surface of an optical article, includes the steps of:
- selecting as the optical article an article (10) with a concave face (12) able to adopt a facing up position in which its uppermost portion is an edge (15) and selecting the concave face as the surface to be coated;
- dispensing a predetermined volume of a coating solution (18) on the concave face (12) along the edge (15), the concave face (12) facing up and the solution being dispensed in a top down manner;
- waiting with no motion of the article (10) for the solution to flow on the concave face (12) until it collects centrally; and
- spinning the article (10) to force the solution back to the edge (15) of the concave face (12).

20 Claims, 2 Drawing Sheets

METHOD FOR SPIN COATING A SURFACE OF AN OPTICAL ARTICLE

FIELD OF THE INVENTION

The invention relates to the spin coating of optical articles.

TECHNOLOGICAL BACKGROUND

Various methods are known for coating surfaces of optical articles so as to provide the optical article with one or more layers such as impact resistant, scratch resistant, anti-smudge or anti-reflective layers.

In the spin coating method, a predetermined volume of coating solution is dispensed in a central location of the article while the article is rotating at an intermediate speed and the article is then rotated at very high speed so as to spread the solution over the entire surface of the article.

The invention is directed to reducing solution wastage during spin coating, especially for high cost solutions and/or solutions which are to be coated with a relatively great thickness.

SUMMARY OF THE INVENTION

The invention accordingly provides a method for spin coating a surface of an optical article, including the steps of:
  selecting as said optical article an article with a concave face able to adopt a facing up position in which its uppermost portion is an edge and selecting said concave face as said surface to be coated;
  dispensing a predetermined volume of a coating solution on said concave face along said edge, said concave face facing up and said solution being dispensed in a top down manner;
  waiting with no motion of said article for said solution to flow on said concave face until it collects centrally; and
  spinning said article to force the solution back to the edge of the concave face.

Unlike conventional spin coating methods, in the method according to the invention the surface to be coated is wetted by the solution not only during the step of spinning the article but also before this step when the solution deposited along the edge of the concave surface flows under the effect of gravity towards the centre of the surface.

The fact that the solution wets the surface twice (and not only once) renders it possible to obtain a uniform layer of solution with a dispensed volume which is much lower than with conventional spin coating.

The wastage of solution is therefore much lower than with conventional spin coating.

According to features preferred for the quality of the results obtained:
  there is no step of dispensing said solution during and after the step of waiting;
  the method further includes after said step of spinning, the step of flipping said article so that said concave face coated with said solution faces down;
  said solution has a viscosity in the range of 1 to 100 cp at 25° C.;
  the coating solution is selected from the group of solutions of primer layer latex comprising functions selected from urethane, (meth)acrylic and butadiene, solutions of liquid crystal material and solutions of polarizing material;
  said coating solution is a solution of primer layer latex made of an aqueous dispersion of polyurethane;
  the coating solution is thermally curable;
  during said step of dispensing a predetermined volume of coating solution, the relative motion between the optical article and a nozzle dispensing said solution is less than 100 rpm;
  during said step of dispensing a predetermined volume of coating solution, the optical article is rotating;
  the duration of the waiting step is in the range of 2 to 10 seconds;
  during said spinning step, the speed of rotation of the optical article is in the range of 100 to 1000 rpm;
  said edge is selected as circular;
  said edge is selected as having a maximum cross dimension within the range of 65 mm to 80 mm; and/or
  said concave face concave face has local radii of curvature within the range of 45 mm to 120 mm.

BRIEF DESCRIPTION OF THE DRAWINGS

The disclosure of the invention will now be continued with the description of example embodiments of the method according to the invention given hereafter in a non-limiting manner with reference to the appended drawings, in which.

DETAILED DESCRIPTION OF EXAMPLE EMBODIMENTS

Figure 1:
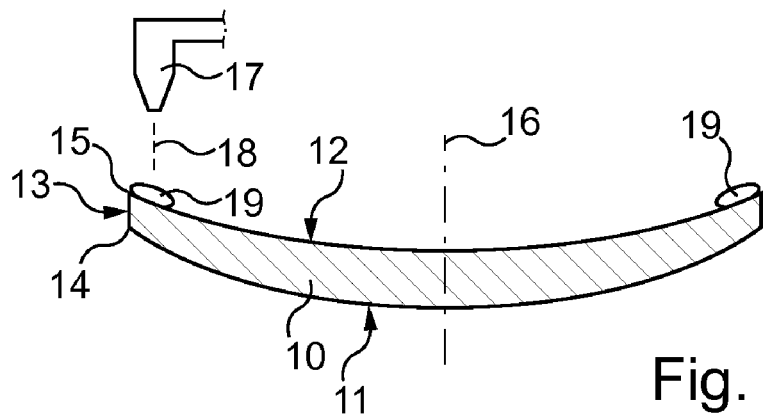
FIG. 1 is a view in section showing an optical lens having a concave surface, a bead of a solution for coating the concave surface and a nozzle of a spin coating device dispensing the solution in a top down manner along the circular edge of the concave surface.

The optical lens 10 illustrated on the drawings has a convex or front face 11, a concave or rear face 12 and a circular rim 13 extending from the edge 14 of convex face 11 to the edge 15 of concave face 12.

Circular rim 13 and circular edges 14 and 15 are centred on the axis of symmetry 16 of optical lens 10.

Figure 2:
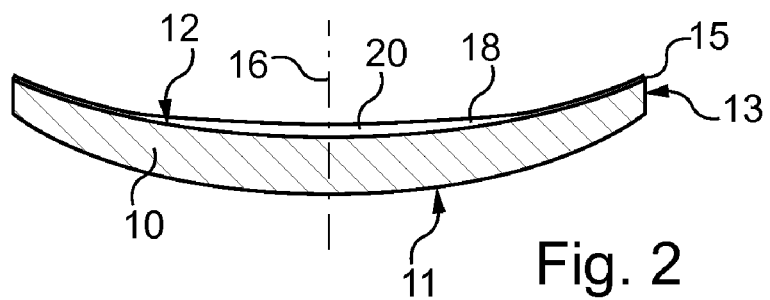
FIG. 2 is a view similar to FIG. 1 showing how the solution dispensed by the nozzle collects in the centre of the concave surface after a certain waiting time with no motion of the optical lens.
Figure 3:
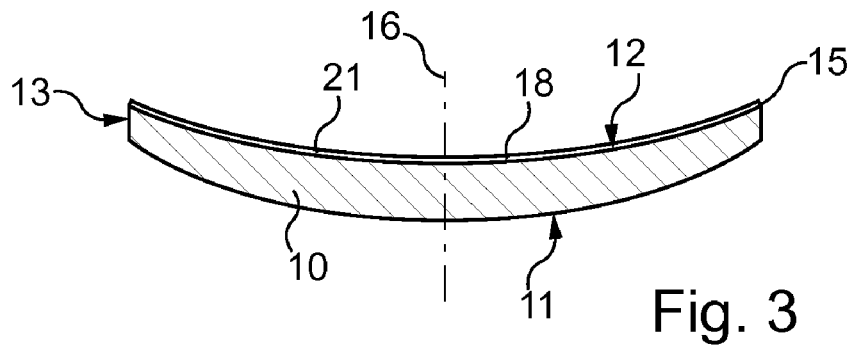
FIG. 3 is a view similar to FIG. 2 but showing how the solution is arranged on the concave surface of the lens after spinning the lens.

In the configurations shown on FIGS. 1 to 3, optical lens 10 is placed in a conventional spin coating machine having a nozzle 17 and a rotatable support (not represented).

Optical lens 10 is mounted on the support with its axis of symmetry 16 coincident with the axis of rotation of the support.

Here, the axis of symmetry 16 and the axis of rotation of the support are vertical, concave face 12 faces up and nozzle 17 is above face 12 so as to dispense a solution 18 with which a coating is to be made in a top down manner.

Unlike conventional spin coating methods, where the solution is dispensed centrally, nozzle 17 is disposed here close to the edge 15 of concave face 12 so as to dispense a predetermined volume of the solution 18 along the circular edge 15.

During dispensing of the solution, nozzle 17 is stationary and optical lens 10 rotates slowly, e.g. 50 rpm.

The solution 18 dispensed by nozzle 17 thus forms an annular bead 19.

The rotation of lens 10 is then stopped for a waiting time, e.g. 3 seconds.

By the effect of gravity, solution 18 flows on surface 12 towards its lowermost portion, that is towards its centre.

Solution 18 thus flows radially and collects centrally, forming a pool 20, as shown on FIG. 2.

During the radial passage from the bead 19 to the pool 20, solution 18 wets the entire or almost the entire face 12.

Lens 10 is afterwards rotated at high speed, e.g. 1000 rpm so that the solution in pool 20 is forced back to the edge 15 of concave face 12.

The rotation at high speed is maintained for a predetermined time, e.g. 8 seconds so as to even out the thickness of the layer 21 of solution 18 formed on surface 12 and spin out beyond edge 15 the excess of solution 18.

Optical lens 10 and solution 18 are at this time in the configuration shown on FIG. 3.

Of course, in the drawings the thickness of layer 21 and certain other thicknesses are bigger than in reality so as to be visible.

The time sequence of the method according to the invention will now be compared with the time sequence of a conventional spin coating method providing a similar layer of coating solution.

Figure 4:
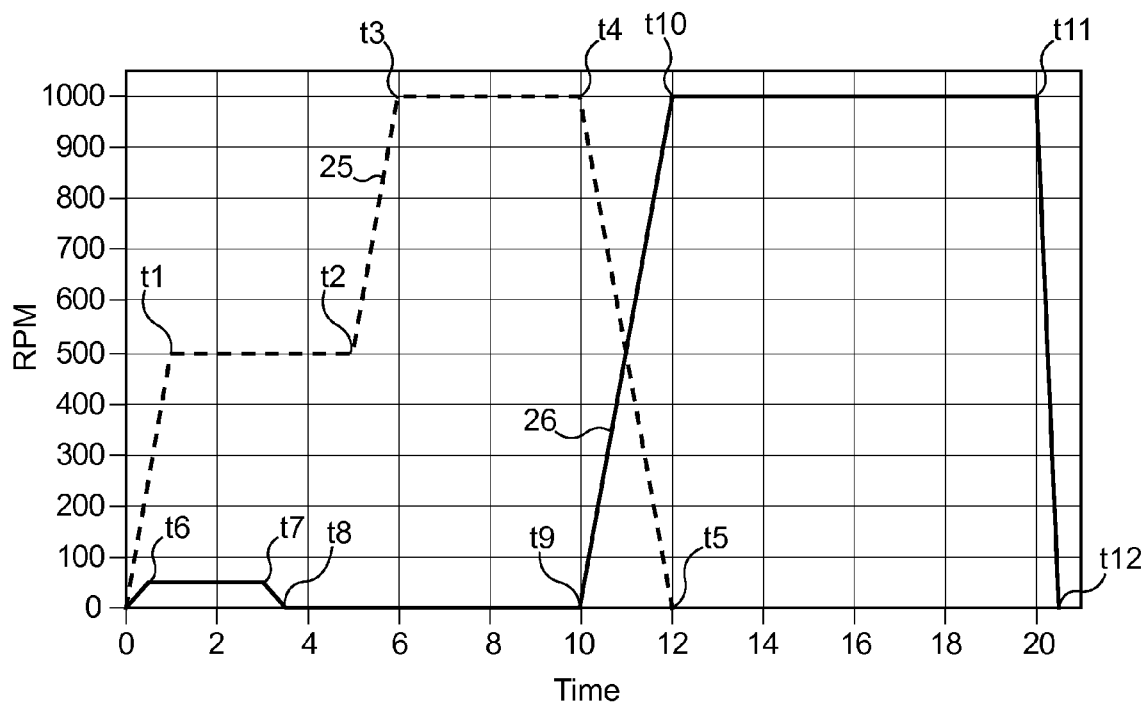
FIG. 4 is a graph showing in continuous line the speed of rotation of the optical lens as a function of time for the method according to the invention and in dashed line for conventional spin coating.

In FIG. 4, curve 25 in dashed line depicts the speed of rotation of the lens as a function of time in a conventional spin coating method and curve 26 in continuous line depicts the speed of rotation of optical lens 10 as a function of time in the method according to the invention.

In conventional spin coating, the lens is brought from time 0 to time t1 (here in 1 second) to an intermediate speed (here 500 rpm) at which it is maintained till time t2, here at 5 seconds.

During the period in which the rotation is maintained at intermediate speed (between times t1 and t2) the predetermined volume of coating solution is dispensed centrally.

The lens is then brought between time t2 to time t3 to a high speed of rotation, here 1000 rpm, in 1 second.

The high speed of rotation is maintained till time t4, here during 4 seconds so as to spin out the solution dispensed between times t1 and t2.

The lens is then braked so as to be stopped at time t5 which is here 2 seconds after time t4.

In the method according to the invention, the lens is brought from time 0 to time t6 (here in 0.5 second) to a slow speed, here 50 rpm.

The predetermined volume of solution 18 is dispensed between times t6 and t7 while optical lens 10 is maintained at the slow speed, here for 3 seconds.

The rotation of lens 10 is braked between times t7 and t8 and lens 10 is maintained with no motion (0 rpm) till time t9 to allow solution 18 to flow on surface 12 by the effect of gravity, here for a little more than 6 seconds.

Optical lens 10 is then rotated so as to reach the speed of 1000 rpm about 2 seconds later (time t10). That speed is maintained for about 8 seconds till time t11 so as to spin out solution 18 and then lens 10 is braked and the rotation of optical lens 10 is stopped at time t12.

The time sequence of the method according to the invention is longer than the time sequence of conventional spin coating methods, mainly because of the waiting period in which the solution dispensed along the edge of the concave face flows radially by gravity towards the centre of the concave face.

The method according to the invention is nevertheless particularly advantageous for solutions which are relatively viscous and which must form a relatively thick layer on the face to be coated, because it renders it possible to provide a layer having the same qualities of uniformity of thickness with a volume of dispensed solution which is much lower.

The following example illustrates the reduction in the volume of dispensed solution provided by the method according to the invention.

Six identical lenses 10 were used.

Each lens is made of the CR39 material.

The circular rim 13 has a diameter of 70 mm.

The radius of the concave face 12 is 88.33 mm (base curve 6).

The same solution of polyurethane latex (PU latex) is used as the coating solution.

The composition of the Polyurethane Latex solution is as follows:

| PU Latex solution | % |
|---|---|
| Deionized water | 33.50 |
| Propylene glycol Ether | 12.00 |
| Polyurethane Latex (W234 - Baxenden) | 52.00 |
| Coupling Agent | 2.50 |

The coupling agent formulation is as follows:

| Coupling Agent Formulation | % |
|---|---|
| GLYMO (3-Glycidyloxypropyl-trimethoxsilane) | 33.10 |
| 3-Acryloxypropyltrimethoxysilane | 41.80 |
| 0.1 N HCl | 19.80 |
| Diacetone alcohol | 3.80 |
| Aluminium acetylacetonate | 1.50 |

Three lenses were spin coated conventionally with the time sequence of curve 25 with a volume of dispensed solution being respectively 1, 2 and 3 ml.

Three other lenses were spin coated with a method according to the invention with the time sequence of curve 26 with a volume of dispensed solution being respectively 1, 1.5 and 2 ml.

Even with the lowest volume (1 ml) dispensed with the method according to the invention the whole of concave face 12 was covered by the coating solution.

With the conventional spin coating method, multiple areas of the concave face 12 were not covered with the dispense volume of 1 ml and 2 ml. Full coverage was obtained only with the dispensed volume of 3 ml.

In this example, the amount of dispensed volume for obtaining full coverage (1 ml) is three times less than the minimum volume needed with the conventional spin coating method (3 ml).

As mentioned above, the method according to the invention is particularly advantageous when the solution with which the coating is to be made is relatively viscous, such as solutions of Photochromic latex, liquid crystal material or polarizing material which are all very expensive.

The invention renders it possible to reduce wastage of expensive or thick coatings.

In the above example, the polyurethane latex solution has a viscosity of 12 cp at 25° C. The viscosity is measured using a Brookfield Model DV-1+ Viscometer.

At the present stage, it is believed that the method according to the invention is particularly advantageous for solution having a viscosity (measured as just mentioned) from 1 to over 100 cp at 25° C. (100 cp is pure latex) for coatings having a thickness in the range of 1 to 40 µm.

During dispensing, the lens may spin up to 100 rpm.

When the lens is spun for spinning out the coating, the speed of rotation can be 100 to 1000 rpm.

In the illustrated example, the distance between the centre of the nozzle 17 and the edge 15 of concave face 12 is about 1 cm so as to have the solution dispensed along edge 15.

Figure 5:
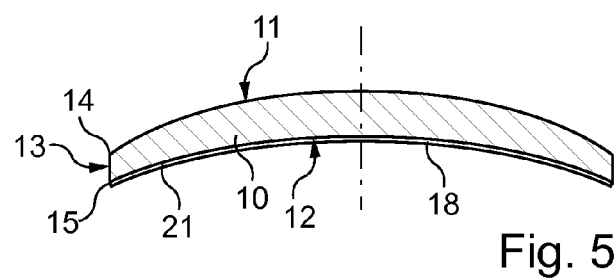
FIG. 5 is a view similar to FIG. 3 but showing the optical article in a flipped position.

In the case where the solution applied so as to form a uniform layer 21 is to be cured for a relatively long time, for instance thermally cured in an oven for more than two minutes, and/or in the case where there is a certain time between the coating step and the curing step, it is useful to flip (turn over) the lens once the spin coating is achieved so that the concave surface 12 faces down, as shown on FIG. 5.

It has been found that the layer 21 is thus more stable and there is less risk of creating thickness variations during the waiting and/or curing period.

In a variant embodiment, during the dispensing step, the optical lens 10 is stationary (no motion as during the waiting step) and the nozzle such as 17 is mobile for dispensing the solution along the edge of the concave surface; or the optical lens and the nozzle are both mobile.

In the drawn embodiment, the optical lens 10 is an ophthalmic lens, here for spectacles.

In variant embodiments, the concave face which is coated belongs to an optical article which is not an ophthalmic lens but another kind of optical lens, for instance a lens of an instrument for viewing remote objects. In other variant embodiments, the optical article is not an optical lens, for example a semi-finished lens or a carrier intended to be integrated into an optical lens, or a carrier, in particular made of polycarbonate, on which one or more layers of coating are made on a concave face for being transferred afterwards onto the convex or front side of an optical lens. WO 2006/133307 discloses such a carrier.

In the drawn embodiment, the concave face 12 is spherical and the rim 13 is circular.

In variant embodiments, the concave face has an edge which is not circular, for instance elliptical; and/or the concave face is able to adopt a facing up position in which its uppermost portion is the edge but the concave face is not spherical. For example, the concave face is the rear surface a progressive ophthalmic lens.

For optimal results, the concave face has a surface that is free from holes or steps and its lowermost portion is located centrally, with the concave face converging from the edge to the centre.

In the drawn embodiment, the rim 13 is circular with a diameter of 70 mm and concave face 12 is spherical with a radius of curvature of 88.33 mm (base curve 6).

The method according to the invention is particularly advantageous for a maximum cross dimension of the edge (i.e. the diameter if the edge is circular) within the range of 65 mm to 80 mm.

The method according to the invention is also particularly advantageous for concave faces having local radii of curvature within the range of 45 mm to 120 mm.

In the drawn embodiment, the substrate of lens 10 is an organic glass substrate, here diethylene glycol bis(allyl carbonate) better known as CR39 from PPG.

In variant embodiments, the substrate of the lens is a mineral glass substrate or another organic glass substrate made of, for example, polycarbonate, polyamide, polyimide, polysulfone, copolymer of polyethyleneterephtalate and polycarbonate, polyolefines, like polynorbornene, polymer and copolymer of (meth)acrylic like polymer and copolymer of bisphenol-A-(meth)acrylic, polymer and copolymer of thio(meth)acrylic, polymer and copolymer of urethane and thiourethane, polymer and copolymer of epoxy, and polymer and copolymer of episulfure.

In the drawn embodiment, the coating solution is a solution of polyurethane latex (PU latex).

The method according to the invention is advantageous for coating solutions selected from the group of primer latex layer solutions comprising functions selected from urethane, (meth)acrylic and butadiene, liquid crystal material and polarizing material. The method according to the invention is particularly advantageous for coating solutions selected from primer latex layer solutions which are an aqueous dispersion of polyurethane. This solution may be optionally photochromic as described hereinbefore.

The method according to the invention is also advantageous for abrasion-resistant coatings applied to substrates. Such coatings are known from the prior art.

For example, U.S. Pat. No. 4,211,823 or EP 0 614 957 discloses abrasion-resistant coating compositions containing hydrolyzed silanes and aluminum compounds, and coated articles resistant to abrasion and impacts.

U.S. Pat. No. 5,316,791, U.S. Pat. No. 6,503,631 and U.S. Pat. No. 6,489,028 disclose a combined bi-layer impact-resistant and anti-abrasion system, comprising respectively a primer coating of cured polyurethane or poly(meth)acrylic latex or latex containing butadiene units to which an abrasion-resistant coating is applied. The latex may also be a photochromic latex, as described in EP 1 161 512 or FR 2 811 322. Such latex may improve the impact resistance of the article to which it is applied and give also photochromic properties to said article.

A suitable abrasion-resistant monolayer may be selected from sol-gel coating and polymerizable UV coating like polymerizable (meth)acrylic or epoxy(meth)acrylic monomers, which may optionally comprise glymo(3-glycidoxypropyltrimethoxysilan). More specifically, suitable abrasion-resistant monolayers can be made of the composition disclosed in EP 0 614 657 B1, U.S. Pat. No. 5,619,288 and EP 1 301 560.

The abrasion-resistant monolayer may be those comprising as the main constituents an epoxyalkoxysilane such as, for example, γ-glycidoxypropyltrimethoxysilane (GLYMO) and optionally a dialkyldialkoxysilane such as, for example, dimethyldiethoxysilane (DMDES), colloidal silica and a catalytically effective amount of a curing catalyst such as aluminum acetylacetonate or a hydrolysate thereof, the remainder of the composition being essentially comprised of solvents typically used for formulating these compositions.

The abrasion-resistant monolayer may be made for example using the composition in claim 8 of EP 0 614 957 B1 and more preferably using the composition described through example 3 of that patent, which composition is based on aluminum and silane hydrolysates A suitable latex layer may be made from the composition described respectively in the following patents: U.S. Pat. No. 5,316,791, U.S. Pat. No. 6,503,631 and U.S. Pat. No. 6,489,028. It is also possible to use as primer latex a photochromic latex as disclosed in EP 1 161 512 and FR 2 811 322.

Preferably the primer latex layer is an aqueous dispersion of polyurethane. Particularly preferred aqueous polyurethane dispersions commercially available include W-240 and W-234 (Baxenden™).

Preferably the abrasion-resistant bi-layer coating comprises a first layer which is the preferred primer latex layer described hereinbefore, and preferably an aqueous dispersion of polyurethane, and a second layer which is the preferred abrasion-resistant monolayer described hereinbefore.

Many other variant embodiments are feasible and it is to be recalled that the invention is not limited to the embodiments illustrated and disclosed.

The invention claimed is:

1. A method for spin coating a surface of an optical article, comprising:
    selecting as said optical article an article (10) with a concave face (12) able to adopt a facing up position with an edge (15) at an uppermost portion of the concave face (12), and selecting said concave face (12) as said surface to be coated;
    dispensing a predetermined volume of a coating solution on said concave face (12), said coating solution being dispensed only to an area along an entirety of said edge (15), said concave face (12) facing up and said coating solution being dispensed to said edge (15) in a top down manner;
    immediately after said dispensing step, waiting with no motion of said article (10) for said coating solution to flow on said concave face (12) until said coating solution collects at a location at a center of the concave face (12); and
    after said waiting step, spinning said article (10) to force the coating solution back to the edge (15) of the concave face (12).

2. The method according to claim 1, wherein no coating solution is dispensed during and after said waiting step.

3. The method according claim 1, further comprising:
    after said step of spinning, flipping said article (10) so that said concave face (12) coated with said coating solution (18) faces down.

4. The method according claim 1, wherein said coating solution has a viscosity in the range of 1 to 100 cp at 25° C.

5. The method according claim 4, wherein said coating solution is selected from the group of solutions of primer layer latex comprising functions selected from the group consisting of urethane, (meth)acrylic and butadiene, solutions of liquid crystal material and solutions of polarizing material.

6. The method according claim 5, wherein said coating solution is a solution of primer layer latex made of an aqueous dispersion of polyurethane.

7. The method according claim 1, wherein the coating solution (18) is thermally curable.

8. The method according claim 1, wherein, during said dispensing step, a relative motion between the optical article (10) and a nozzle (17) dispensing said coating solution is less than 100 rpm.

9. The method according claim 8, wherein during dispensing step, the optical article (10) is rotating.

10. The method according claim 1, wherein the duration of the waiting step is in the range of 2 to 10 seconds.

11. The method according claim 1, wherein, during said spinning step, the speed of rotation of the optical article (10) is in the range of 100 to 1000 rpm.

12. The method according claim 1, wherein said edge (15) is circular.

13. The method according claim 1, wherein said edge (15) has a maximum cross dimension within the range of 65 mm to 80 mm.

14. The method according claim 1, wherein said concave face (12) has local radii of curvature within the range of 45 mm to 120 mm.

15. The method according claim 2, further comprising:
    after said step of spinning, flipping said article (10) so that said concave face (12) coated with said coating solution (18) faces down.

16. The method according claim 2, wherein said coating solution has a viscosity in the range of 1 to 100 cp at 25° C.

17. The method according claim 2, wherein the coating solution (18) is thermally curable.

18. The method according claim 12, wherein, during dispensing step, a relative motion between the optical article (10) and a nozzle (17) dispensing said coating solution is less than 100 rpm.

19. The method according claim 2, wherein the duration of the waiting step is in the range of 2 to 10 seconds.

20. The method according claim 2, wherein, during said spinning step, the speed of rotation of the optical article (10) is in the range of 100 to 1000 rpm.

* * * * *